United States Patent
Ozeki et al.

(10) Patent No.: US 10,324,671 B2
(45) Date of Patent: Jun. 18, 2019

(54) SYSTEM INCLUDING A FIRST AND SECOND TERMINAL, INFORMATION PROCESSING APPARATUS, AND NON-TRANSITORY COMPUTER READABLE MEDIUM STORING A PROGRAM FOR CHANGING ACQUIRED SETTING DATA

(71) Applicant: FUJI XEROX CO., LTD., Tokyo (JP)

(72) Inventors: Kazunori Ozeki, Kanagawa (JP); Naomi Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/601,137

(22) Filed: May 22, 2017

(65) Prior Publication Data
US 2018/0074762 A1    Mar. 15, 2018

(30) Foreign Application Priority Data
Sep. 13, 2016  (JP) .................................. 2016-178386

(51) Int. Cl.
G06F 3/12   (2006.01)

(52) U.S. Cl.
CPC .......... *G06F 3/1238* (2013.01); *G06F 3/1205* (2013.01); *G06F 3/1257* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 2015/0029529 A1* | 1/2015 | Oda | H04N 1/00352 358/1.13 |
| 2016/0026416 A1* | 1/2016 | Kikuchi | G06F 3/1226 358/1.15 |
| 2018/0007219 A1* | 1/2018 | Oyama | H04N 1/00411 |

FOREIGN PATENT DOCUMENTS

| | | |
|---|---|---|
| JP | 2009-205257 A | 9/2009 |
| JP | 2011-100352 A | 5/2011 |

* cited by examiner

*Primary Examiner* — Thomas D Lee
(74) *Attorney, Agent, or Firm* — Oliff PLC

(57) ABSTRACT

A system includes a first terminal and a second terminal. The first terminal includes a monitoring unit that monitors operations performed on applications, a holding unit that holds, on an application basis, setting data indicating an operation history regarding print settings, a first transmitting unit that transmits the setting data to the second terminal, and an output unit that outputs, in a case where setting data is received from the second terminal, a command to set print settings to an application corresponding to the received setting data. The second terminal includes a display control unit that acquires the setting data from the first terminal and displays a screen illustrating print settings including at least a setting item corresponding to the acquired setting data, and a second transmitting unit that changes the acquired setting data and transmits the changed setting data to the first terminal.

6 Claims, 12 Drawing Sheets

FIG. 9

| ITEM | CONTENT |
|---|---|
| APPLICATION TYPE | APPLICATION A |
| OPERATION FOR DISPLAYING PRINT DIALOG BOX | FILE MENU → PRINT |
| PRINT DIALOG BOX | "PRINT" DIALOG BOX |
| PRINT BUTTON (OK BUTTON) | "PRINT" BUTTON |
| PROPERTIES BUTTON OF PRINTER | "PROPERTIES" BUTTON |
| ANOTHER SETTING 1 | NUMBER OF COPIES |
| ANOTHER SETTING 1: TYPE | NUMERIC VALUE INPUT |
| ANOTHER SETTING 2 | PRINT IN GRAYSCALE (MONOCHROME) |
| ANOTHER SETTING 2: TYPE | CHECK BOX |
| ANOTHER SETTING 3 | ANNOTATION AND FORM |
| ANOTHER SETTING 3: TYPE | COMBO BOX |
| ANOTHER SETTING 3: OPTIONS | TEXT/TEXT AND ANNOTATION/ TEXT AND STAMP |
| ... | ... |

FIG. 10

| ITEM | CONTENT |
|---|---|
| APPLICATION TYPE | APPLICATION A |
| HISTORY 1 | NUMBER OF COPIES |
| HISTORY 1: SET VALUE | 3 |
| HISTORY 2 | DRIVER SETTING - Nup |
| HISTORY 2: SET VALUE | 2 |

FIG. 11

| APPLICATION TYPE |
|---|
| APPLICATION A |
| APPLICATION B |
| ... |

FIG. 12

|  | NOT PRINTING/ PRINTING | OPERATING PRINT SETTINGS | WAITING FOR PRINTING TO START |
|---|---|---|---|
| PRINT DIALOG BOX | CLOSED | OPEN | OPEN |
| DIALOG BOX OPERATION | - | BEING PERFORMED | NOT BEING PERFORMED |

FIG. 13

| PC NAME | USERNAME | APPLICATION BEING EXECUTED |
|---|---|---|
| PC.A | fx11111 | APPLICATION A |
| PC.B | fx22222 | APPLICATION B |
| PC.C | fx33333 | APPLICATION C |

COMMAND PC TO PRINT

PLEASE SELECT PC YOU WANT TO USE FOR PRINTING FROM THE FOLLOWING.

ENTER

FIG. 14

COMMAND PC TO PRINT

PLEASE ENTER AUTHENTICATION INFORMATION.

PASSWORD  ******

ENTER

FIG. 16

| DISPLAY ORDER | APPLICATION TYPE | DATA | GRASPED APPLICATION OR NOT |
|---|---|---|---|
| 1 | APPLICATION A | DATA A1 | YES |
| 2 | APPLICATION A | DATA A2 | YES |
| 3 | APPLICATION B | DATA B | YES |
| 4 | APPLICATION C | DATA C | NO |

FIG. 17

| FOLDER INFORMATION | MEMO |
|---|---|
| MyDocuments | |
| DESKTOP | |
| MyDocuments¥subfolderA | INFORMATION REGARDING FOLDER THAT IS CURRENTLY OPEN |
| C:¥mydata¥SUB-B | INFORMATION REGARDING FOLDER THAT IS CURRENTLY OPEN |

FIG. 18

| IN-FOLDER INFORMATION | TYPE |
|---|---|
| SUBFOLDER | FOLDER |
| FILE A | FILE |
| FILE B | FILE |
| ... | ... |

SYSTEM INCLUDING A FIRST AND SECOND TERMINAL, INFORMATION PROCESSING APPARATUS, AND NON-TRANSITORY COMPUTER READABLE MEDIUM STORING A PROGRAM FOR CHANGING ACQUIRED SETTING DATA

CROSS-REFERENCE TO RELATED APPLICATIONS

This application is based on and claims priority under 35 USC 119 from Japanese Patent Application No. 2016-178386 filed Sep. 13, 2016.

BACKGROUND

Technical Field

The present invention relates to a system, an information processing apparatus, and a non-transitory computer readable medium.

SUMMARY

According to an aspect of the invention, there is provided a system including a first terminal and a second terminal. The first terminal includes a monitoring unit that monitors operations performed on applications by a user, a holding unit that holds, on an application basis, setting data indicating the user's operation history regarding print settings in accordance with the monitored operations, a first transmitting unit that transmits the setting data to the second terminal, and an output unit that outputs, in a case where setting data is received from the second terminal, a command to set print settings in accordance with an operation corresponding to the received setting data to an application corresponding to the received setting data. The second terminal includes a display control unit that acquires the setting data from the first terminal and displays, on a display, a screen illustrating print settings including at least a setting item corresponding to the acquired setting data, and a second transmitting unit that changes the acquired setting data in accordance with an operation performed on the second terminal by the user and transmits the changed setting data to the first terminal.

BRIEF DESCRIPTION OF THE DRAWINGS

An exemplary embodiment of the present invention will be described in detail based on the following figures, wherein:

FIG. 9 is a diagram illustrating an example of information acquired by a resident application;

FIG. 10 is a diagram illustrating an example of setting data;

FIG. 11 is a diagram illustrating an example of the content of a grasped-application list;

FIG. 12 is a diagram illustrating relationships between client statuses and determination results;

FIG. 13 is a diagram illustrating an example of a list displayed on a display device;

FIG. 14 is a diagram illustrating an example of an authentication-information input screen;

FIG. 16 is a diagram illustrating an example of a being-displayed list;

FIG. 17 is a diagram illustrating an example of the content of folder information;

FIG. 18 is a diagram illustrating an example of the content of in-folder information;

DETAILED DESCRIPTION

1. Configuration

Figure 1:
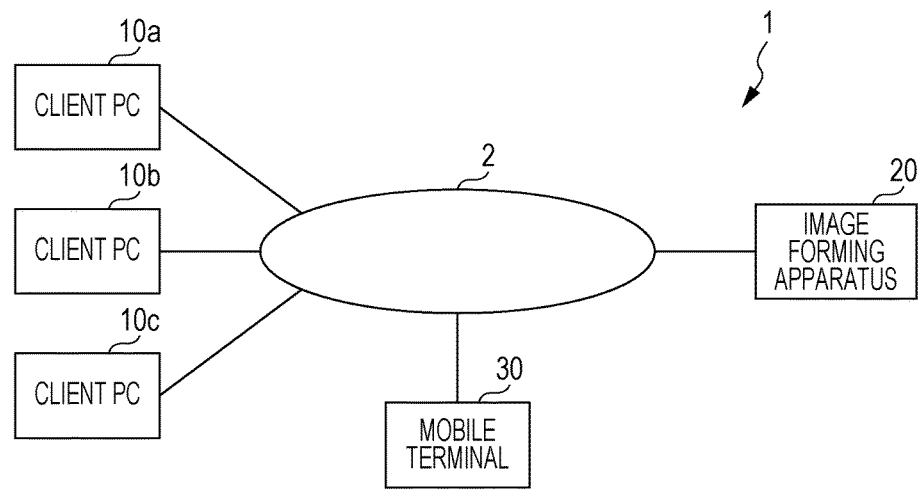
FIG. 1 is a diagram illustrating the configuration of a system.

FIG. 1 is a block diagram illustrating the configuration of a system 1 according to an exemplary embodiment. The system 1 includes client personal computers (PCs) 10a, 10b, and 10c (first terminals, an example of information processing apparatuses), an image forming apparatus 20, and a mobile terminal 30 (an example of a second terminal). The client PCs 10a, 10b, and 10c are devices operated by users, and are for example personal computers. The image forming apparatus 20 forms images on recording mediums such as pieces of paper using for example an electrophotographic system. The mobile terminal 30 is a device carried by a user, and is for example a smartphone. The client PCs 10a, 10b, and 10c are connected to the image forming apparatus 20 and the mobile terminal 30 via a communication line 2. The communication line 2 includes, for example, at least one of the Internet, a mobile telecommunications network, a telephone line, a local-area network (LAN), and the like. In the following description, in the case where the client PCs 10a, 10b, and 10c do not have to be distinguished from each other, these are called "client PCs 10" for brevity.

Figure 2:
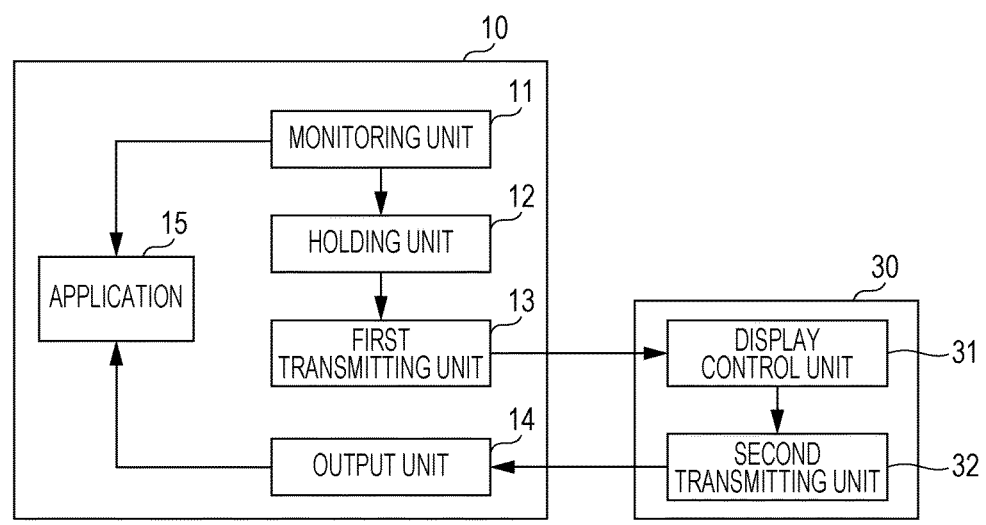
FIG. 2 is a diagram illustrating a functional configuration of the system.

FIG. 2 is a block diagram illustrating an example of a functional configuration of the system 1. Each client PC 10 includes a monitoring unit 11, a holding unit 12, a first transmitting unit 13, and an output unit 14. The monitoring unit 11 monitors operations performed on applications 15 by a user. The holding unit 12 holds, on an application 15 basis, setting data indicating the user's operation history regarding print settings in accordance with the operations monitored by the monitoring unit 11. The first transmitting unit 13 transmits the setting data to the mobile terminal 30. Upon receiving setting data from the mobile terminal 30, the output unit 14 outputs, to an application 15 corresponding to the received setting data, a command to set print settings in accordance with operations corresponding to the received setting data.

A display control unit 31 acquires setting data from the client PC 10, and displays, on a display, a screen illustrating print settings including at least a setting item corresponding to the acquired setting data. A second transmitting unit 32 changes, in accordance with an operation performed on the mobile terminal 30 by the user, the setting data acquired by the display control unit 31, and transmits the changed setting data to the client PC 10.

Figure 3:
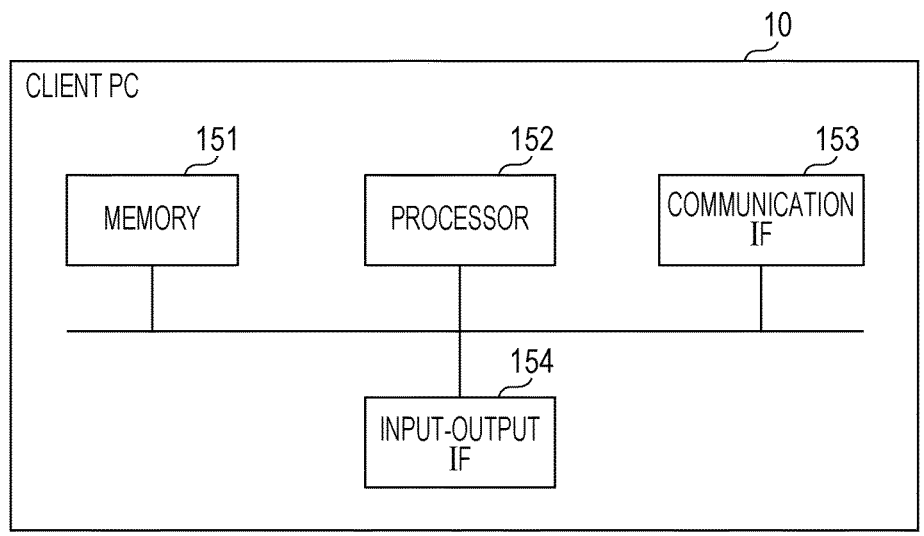
FIG. 3 is a diagram illustrating a hardware configuration of a client personal computer (PC)

FIG. 3 is a diagram illustrating an example of a hardware configuration of the client PC 10. In FIG. 3, a memory 151 stores various types of data. A processor 152 performs data processing in accordance with a program stored in the memory 151. A communication interface (IF) 153 is an interface that performs data communication with external apparatuses via a network. An input-output IF 154 is an interface that receives and outputs operation data and image data from and to the external apparatuses. To the input-output IF 154, operation devices such as a keyboard and a mouse and a display device such as a liquid crystal display are connected. Note that the client PC 10 may include at least either the operation devices or the display device.

Figure 4:
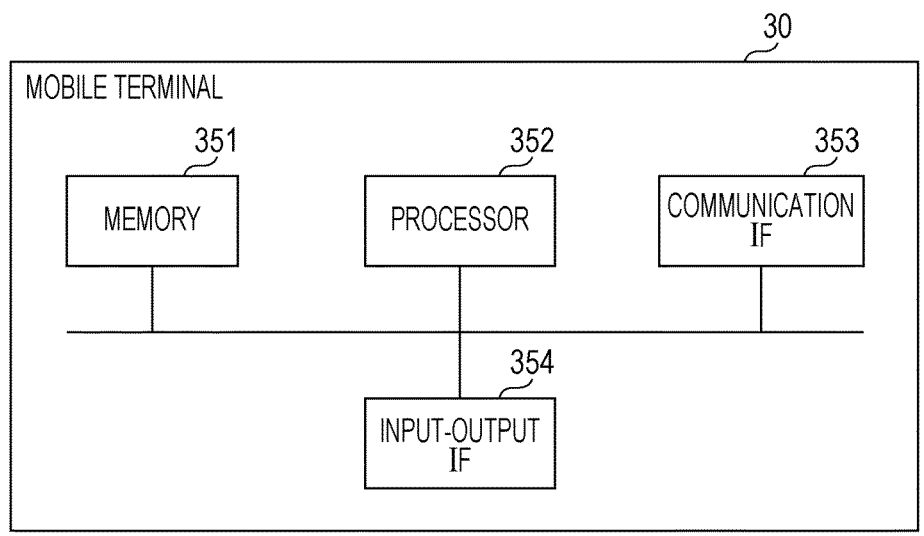
FIG. 4 is a diagram illustrating a hardware configuration of a mobile terminal.

FIG. 4 is a diagram illustrating an example of a hardware configuration of the mobile terminal 30. In FIG. 4, a memory 351 stores various types of data. A processor 352 performs data processing in accordance with a program stored in the memory 351. A communication IF 353 is an interface that performs data communication with external apparatuses via a network. An input-output IF 354 is an interface that receives and outputs operation data and image data from and to the external apparatuses. To the input-output IF 354, operation devices such as a keyboard and a mouse and a display device such as a liquid crystal display are connected. Note that the mobile terminal 30 may include at least either the operation devices or the display device.

In this example, the functions illustrated in FIG. 2 are realized through execution of the programs stored in the memory 151, the memory 351, or both, the execution being performed by the processor 152, the processor 352, or both. The processor 152, the processor 352, or both executing the programs are an example of the monitoring unit 11, the holding unit 12, the first transmitting unit 13, the output unit 14, the display control unit 31, and the second transmitting unit 32.

Figure 5:
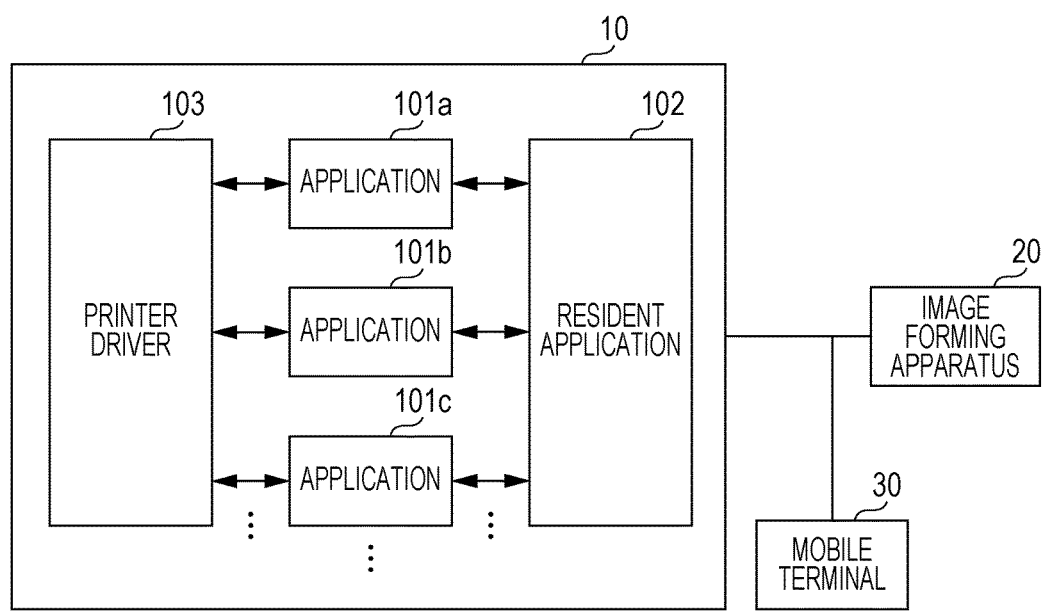
FIG. 5 is a diagram illustrating a software configuration of the client PC.

FIG. 5 is a diagram illustrating an example of a software configuration of the client PC 10. Applications 101a, 101b, 101c, and so on (an example of the applications 15) have for example a function for generating document files and the like and a function for commanding a printer driver 103 to form images regarding a generated document file. The applications 101a, 101b, 101c, and so on may also have a function for displaying a user interface (UI) screen through which a user sets settings (double-sided/single-sided, monochrome/color, and the like) regarding image forming processing. In the following description, in the case where the applications 101a, 101b, 101c, and so on do not have to be distinguished from each other, these are called "applications 101" for brevity. Moreover, the settings regarding image forming processing are called "print settings" for brevity in the following description.

A resident application 102 monitors operations performed on the applications 101 by the user, and specifies setting items or an operation procedure changed by the user in the print settings. The resident application 102 is preinstalled in the client PC 10. The resident application 102 monitors operations performed by the user (for example, operations performed on the keyboard, the mouse, a touch panel, and the like by the user) and also monitors a screen displayed on the display device connected to the client PC 10. In addition, the resident application 102 receives a command from the mobile terminal 30, and executes processing corresponding to the received command.

The printer driver 103 converts, in accordance with a command from an application 101 among the applications 101, processing data to be subjected to image forming processing into data having a data format (for example, a page description language (PDL) format) interpretable by the image forming apparatus 20. The printer driver 103 is preinstalled in the client PC 10. The applications 101, the resident application 102, and the printer driver 103 are realized by the processor 152 executing programs stored in the memory 151.

2. Operation 2-1. User's Print-Setting Operation History Accumulation Operation

First, an operation for accumulating a user's operation procedure history will be described. The user activates, using the operation devices connected to the client PC 10, an application 101 corresponding to a file for which the user wants to perform image forming processing, specifies the file, which is to be subjected to image forming processing, and performs an operation for setting print settings and for commanding image forming processing. The processor 152 of the client PC 10 activates the application 101 in accordance with an operation performed by the user, and displays a screen illustrating print settings (hereinafter referred to as "print dialog box") on the display device. The user performs an operation for setting the print settings using the operation devices while referring to the print dialog box displayed on the display device.

The print dialog box includes UI parts (a text box, a pull-down list, a check box, an option button, a print button, and the like) for setting the print settings and for commanding image forming. The print settings have, for example, a setting item for the size (A4, B3, or the like) of mediums to be used in image forming processing and a setting item for "single-sided/double-sided". The size and content of the print dialog box differs depending on the type of the application 101 displaying the print dialog box, and may include a special setting item depending on the type of application 101.

Figure 6:
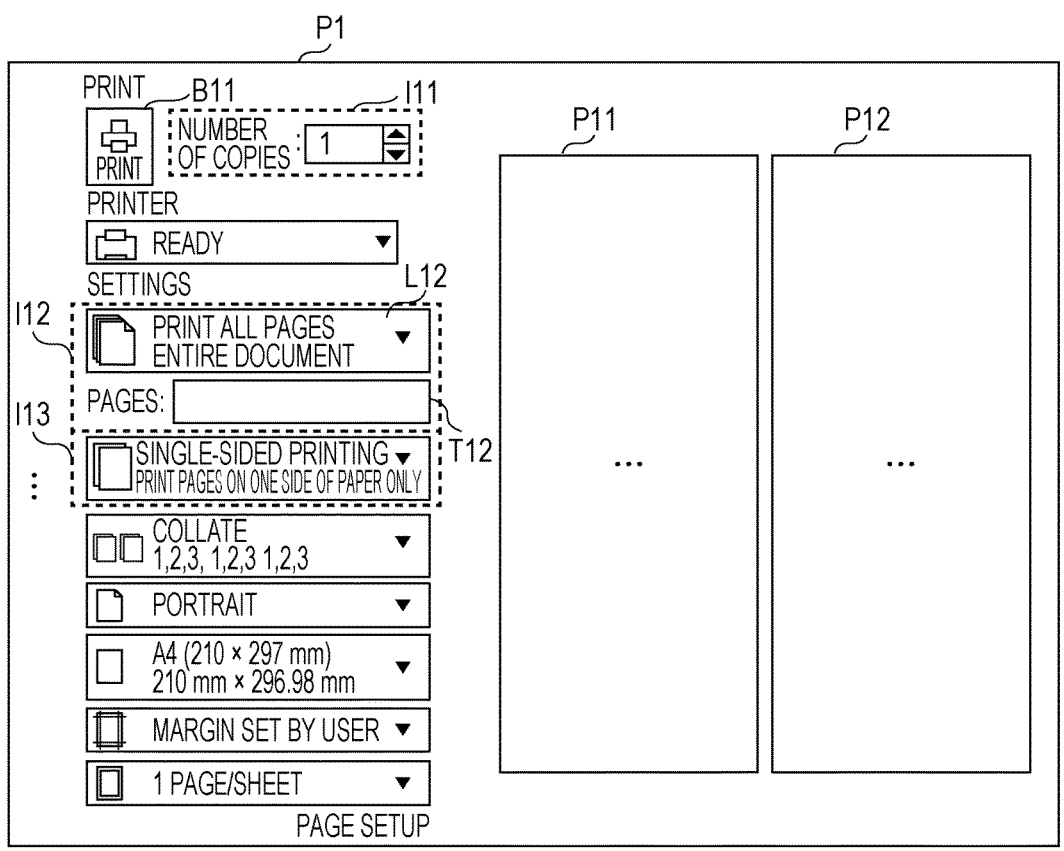
FIG. 6 is a diagram illustrating an example of a print dialog box.
Figure 7:
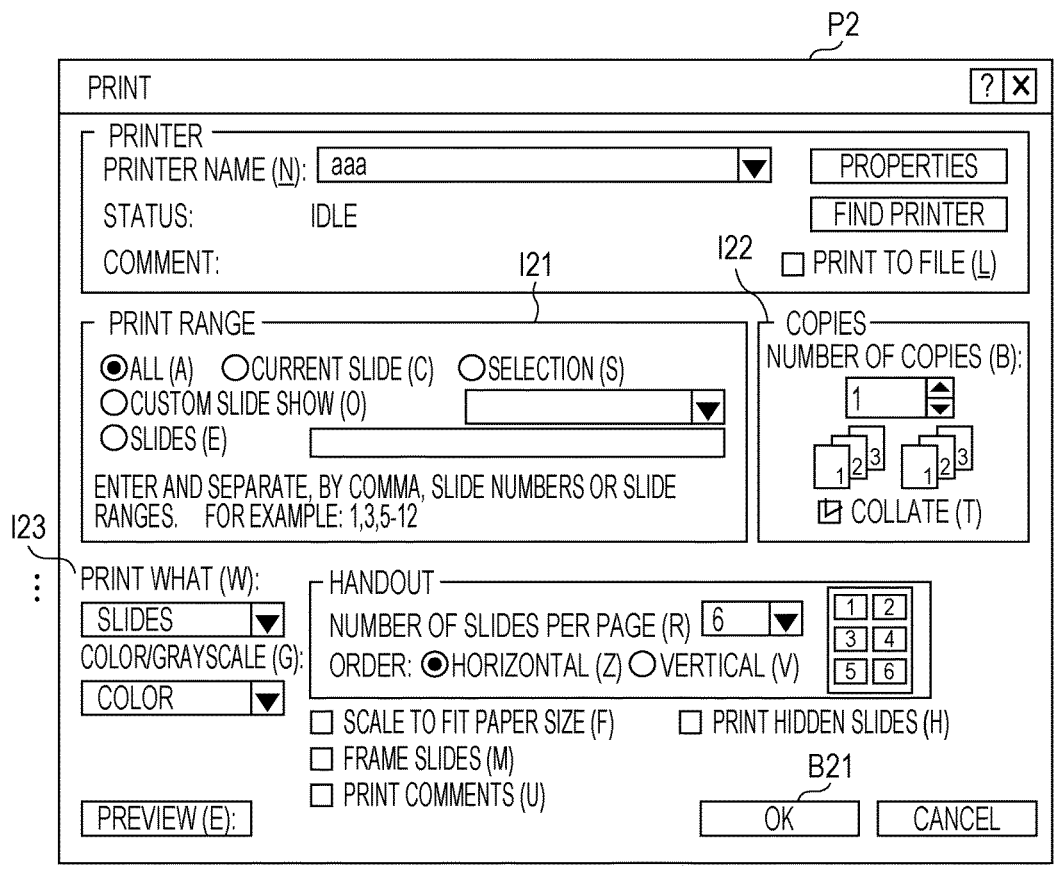
FIG. 7 is a diagram illustrating an example of a print dialog box.

FIGS. 6 and 7 are diagrams illustrating examples of the print dialog box. A print dialog box P1 illustrated in FIG. 6 includes a print button B11 and also includes UI parts corresponding to setting items I11, I12, I13, and so on regarding printing. For example, the setting item I12 includes a pull-down list L12 for selecting "print all pages" or "print specified pages", and a text box T12 with which a user specifies pages to be printed in the case where "print specified pages" has been selected. In addition, some of the setting items included in the print dialog box P1 each include text describing the setting item (hereinafter referred to as "item-name text"). For example, the setting item I11 includes item-name text that is "number of copies". In addition, the print dialog box may also include file preview screens P11 and P12 illustrated in FIG. 6.

A print dialog box P2 illustrated in FIG. 7 includes a print button (OK button) B21 and also includes setting items I21, I22, I23, and so on regarding printing. The setting items I21, I22, I23, and so on include at least either UI parts or item-name text.

Figure 8:
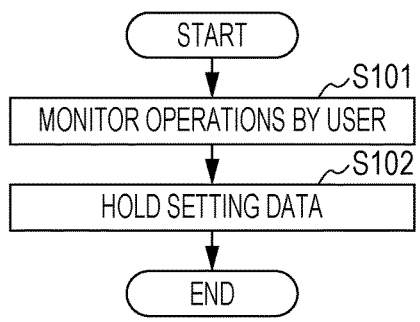
FIG. 8 is a flowchart illustrating the procedure of processing performed by the client PC.

FIG. 8 is a flowchart illustrating the procedure of processing performed by the processor 152 of the client PC 10. In step S101, the resident application 102 monitors operations performed on the applications 101 by a user, and acquires information regarding setting items and an operation procedure changed by the user.

FIG. 9 is a diagram illustrating an example of the content of information acquired by the resident application 102. The pieces of information illustrated in FIG. 9 will be described in order. First, "application type" is information indicating the type of application. This information is acquired by the resident application 102 monitoring the applications 101.

In addition, the resident application 102 detects a "print-dialog-box display operation" by monitoring the applications 101. In this exemplary embodiment, in the case where processing for displaying a print dialog box is specified through processing described later, the resident application 102 regards, as the print-dialog-box display operation, the operation performed by the user immediately before display of the print dialog box (for example, an operation performed on the keyboard, the mouse, or the touch panel).

In addition, the resident application 102 detects displaying of the "print dialog box". In this exemplary embodiment, in the case where a capability application programming interface (API) of the printer driver 103 is called immediately after the resident application 102 detects displaying of a new screen, the resident application 102 regards the screen as the print dialog box. As another example, the resident application 102 may extract, from data of the displayed screen, text indicating the title of the displayed screen or the name of a button included in the displayed screen and determine whether the displayed screen is a print dialog box on the basis of the extracted text. For example, the resident application 102 may regard, as a print dialog box, a screen whose title is "print" or a screen including a "print button" and a "printer properties button".

In addition, the resident application 102 detects at least either the position of the "print button" included in the print dialog box or an operation through which the button is selected (pressed). That is, the resident application 102 monitors the applications 101, and detects an operation procedure for causing an image forming command to be issued. In this exemplary embodiment, in the case where a printing API of the printer driver 103 is called immediately after a button within the print dialog box is selected (pressed), the resident application 102 regards the button as the print button.

In addition, in the case where the user has selected or changed a setting item included in the print dialog box, the resident application 102 also detects the content of the setting or the operation procedure. For example, in the case where the user has input text in a text box included in the print dialog box, the resident application 102 acquires the text input in the text box (hereinafter referred to as "input text") and specifies item-name text whose positional relationship with respect to the text box satisfies predetermined conditions. As an item-name-text specification method, for example, the text displayed adjacent to the text box may be specified as the item-name text.

In addition, the resident application 102 may also detect an operation through which the "properties" button included in the print dialog box is selected (pressed). For example, in the case where a UI-display API of the printer driver 103 is called immediately after a button within the print dialog box is selected (pressed), the resident application 102 may also regard the button as the properties button.

Referring back to FIG. 8, in step S102, the resident application 102 generates, in accordance with a result of monitoring the applications 101, setting data indicating the user's operation history regarding the print settings of the applications 101, and holds the setting data on an application 101 basis in the memory 151. In this exemplary embodiment, regarding multiple setting items, the setting data includes information indicating item-name text, a set value, and a UI-part type for each setting item. In addition, the setting data may also include data regarding a predetermined setting item other than the setting items changed by the user.

FIG. 10 is a diagram illustrating an example of the setting data accumulated in the memory 151. FIG. 10 illustrates an example of the setting data in the case where, regarding an "application A", the setting item whose item-name text is "number of copies" is set to "3" as a set value and the setting item whose item-name text is "driver setting—Nup" is set to "2" as a set value.

In addition, the resident application 102 adds, to a grasped-application list, information indicating the type of application whose setting data is stored in the memory 151.

FIG. 11 illustrates an example of the content of the grasped-application list stored in the memory 151. In the example illustrated in FIG. 11, two applications 101, the "application A" and an "application B", are registered in the list as applications whose setting data has already been acquired.

The resident application 102 monitors operations performed on the applications 101 by the user. Every time an operation regarding print settings or an image forming command is performed, the resident application 102 accumulates, in the memory 151, setting data indicating the content of the operation. The accumulated setting data is used when a UI screen for setting the print settings at the mobile terminal 30 is displayed.

2-2. Image Forming Command Operation Using Mobile Terminal 30

Here, there may be a case where for some reason the user wants to change the print settings of image forming processing that the user has commanded (or has planned to command) using the client PC 10, and then to execute the image forming processing (or does not want to change the print settings but wants to execute the image forming processing). For instance, examples of such a case include the case where the user wants to change the print settings of image forming processing performed before and execute the image forming processing again and the case where although the user has set the print settings at the client PC 10, the user has failed to perform an operation for issuing an image forming command. An operation performed to issue an image forming command by the user using the mobile terminal 30 in such a case will be described.

First, in order to select a client PC 10 that is to be caused to issue an image forming command from among multiple client PCs 10, the user requests acquisition of client information by pressing a "client selection button" included in a screen displayed on a display device of the mobile terminal 30. The mobile terminal 30 confirms the client PCs 10 connected to the communication line 2, and acquires client information. In the exemplary embodiment, the client information is acquired through the resident applications 102 of the client PCs 10.

The client information is constituted by the statuses of the client PCs 10 (hereinafter referred to as "client statuses"), client names, login usernames, and application names. For each client PC 10, the client status is information used to determine whether it is expected that it is immediately before the print button is pressed at the client PC 10. As the client status, four types that are "not printing", "operating print settings", "waiting for printing to start", and "printing" are used.

The client names, the login usernames, and the application names are presented to the user as information enabling the user to specify the client PC 10. As the client names, names assigned to the client PCs 10 are used. As the login usernames, usernames of the users who are currently logged in to the client PCs 10. As the application names, the names of applications for files to be printed by the client PCs 10 are used.

Upon receiving a request for acquisition of the client information, the resident applications 102 generate client information by performing the following processing. First, each resident application 102 determines whether a print dialog box is open at the client PC 10. Next, the resident application 102 determines, with reference to the user's operation history, whether the user is operating the print dialog box. In the exemplary embodiment, the resident application 102 compares, with the current time, the time of the last operation performed on the client PC 10 by the user, and determines whether the difference between the times exceeds a certain threshold. In the case where it is determined that the difference exceeds the threshold, the resident application 102 determines that the client PC 10 has not been operated for a while.

FIG. 12 is a diagram illustrating relationships between the client statuses and determination results. In this example, the resident application 102 determines the client status under a condition as to whether the print dialog box is closed or open and a condition as to whether the user is operating the print dialog box. Note that the resident application 102 is unable to distinguish "not printing" and "printing" from each other among the client statuses; however, these client statuses do not have to be distinguished from each other as long as client PCs 10 waiting for printing to start are specified in the exemplary embodiment.

The resident application 102 determines the client status in accordance with the relationships illustrated in FIG. 12 and notifies the mobile terminal 30 of client information including the specified client status. The mobile terminal 30 receives such client information from the multiple client PCs 10. The mobile terminal 30 confirms the client statuses included in the client information acquired from the client PCs 10, and displays, on the display device, a list of client PCs 10 whose client statuses indicate a status of "waiting for printing to start".

FIG. 13 is a diagram illustrating an example of the list of client PCs 10 displayed on the display device of the mobile terminal 30. As illustrated in FIG. 13, regarding the client PCs 10 whose client statuses indicate "waiting for printing to start", a list of PC names, usernames, and applications being executed is displayed on the display device. Pieces of information included in this list may be sorted in accordance with times for each of which the user is not operating a corresponding one of the client PCs 10. In that case, a reference time is preset as a parameter, and the pieces of information may be sorted such that the differences from the reference time to the respective times are arranged from small to large. The reference time may be fixed or may be calculated and updated, when the client PC 10 is selected, on the basis of the time during which the user has performed no operation on the client PC 10 since the last use of this function.

The user selects a desired client PC 10 from the list of client PCs 10 displayed on the display device of the mobile terminal 30, and then presses an enter button. When the enter button is pressed, the operation screen shifts to an authentication-information input screen.

FIG. 14 is a diagram illustrating an example of the authentication-information input screen. The user inputs authentication information using this screen. As an authentication method, for example, in the case where the client PC 10 joins a predetermined domain, the mobile terminal 30 may send the authentication information to the domain and request performing of authentication at the domain. In this case, the authentication is performed by a domain controller. In the case where the client PC 10 joins no domain, the authentication may be locally performed.

Through the processing described above, the client PC 10 is specified that is to be caused to issue an image forming command.

In the case where the authentication has been successful (that is, when the client PC 10 is specified that is to be caused to issue an image forming command), the mobile terminal 30 issues an image forming command to the specified client PC 10. Which file to be subjected to image forming processing is selected in accordance with an operation performed by the user. For example, in the case where a file is displayed at the client PC 10, the processor 352 specifies the file as a file to be processed, and may also specify an application corresponding to the file as an instruction target. A method for specifying data to be processed other than this method may be used. For example, the processor 352 may select, as a target to be processed, any of folders displayed at the client PC 10 or any piece of the data stored in a predetermined working folder.

Figure 15:
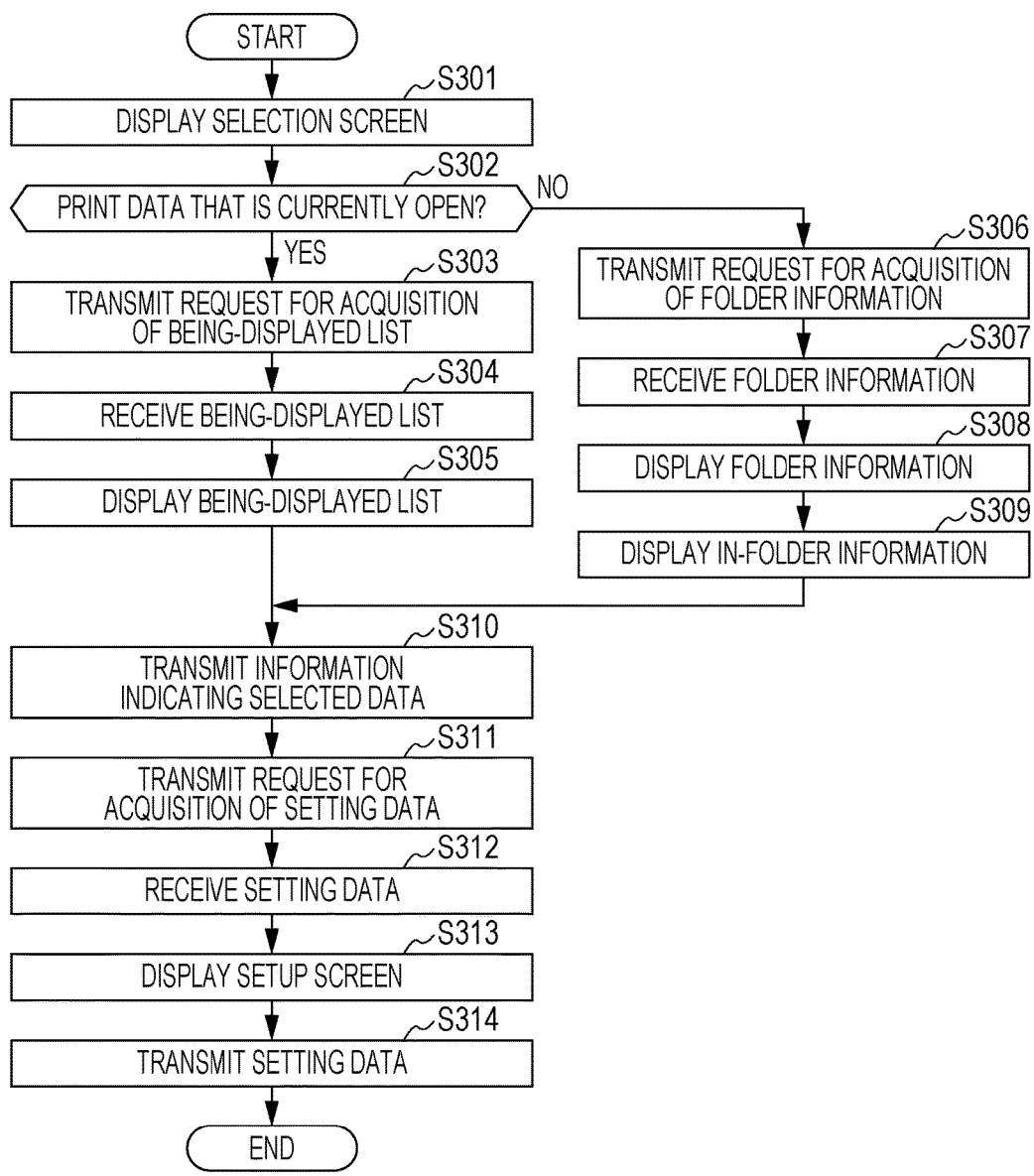
FIG. 15 is a flowchart illustrating the procedure of processing performed by the mobile terminal.

FIG. 15 is a flowchart illustrating a series of processes that the mobile terminal 30 performs to cause the client PC 10 to issue an image forming command. First, in step S301, the processor 352 of the mobile terminal 30 displays, on the display device, a screen for selecting either "print using data/application currently open" or "select data from folder and print". The user selects either "print using data/application currently open" or "select data from folder and print" while referring to the screen displayed on the display device. In step S302, in the case where the user has selected "print using data/application currently open", the process proceeds to step S303. In contrast, in the case where the user has selected "select data from folder and print", the process proceeds to step S306.

In step S303, the processor 352 transmits, to the resident application 102 of the client PC 10, a request for acquisition of information regarding data that is being displayed and applications for the data (a being-displayed list). Upon receiving the acquisition request from the mobile terminal 30, the resident application 102 of the client PC 10 acquires a list regarding the data that is currently open and the applications 101 with which the data is opened (hereinafter referred to as "being-displayed list") and transmits the being-displayed list to the mobile terminal 30. In step S304, the mobile terminal 30 receives the being-displayed list from the client PC 10.

FIG. 16 is a diagram illustrating an example of the being-displayed list transmitted to the mobile terminal 30. In this example, the data included in the being-displayed list has items "display order", "application type", "data", and "grasp flag", and these items are associated with each other. The "display order" is information indicating where in the order from the top (the forefront) on the screen of a display device of the client PC 10. The "application type" is information indicating the type of application. The "data" is information used to identify a displayed file (a document file or the like). The "grasp flag" is information indicating whether the setting data regarding the application is accumulated in the memory 151 (that is, whether the application is registered in the grasped-application list). In the case where the application is registered in the grasped-application list, "YES" is stored in this item. In contrast, in the case where the application is not registered in the grasped-application list, "NO" is stored in this item.

Referring back to FIG. 15, in step S305, the processor 352 displays the acquired being-displayed list on the display device. The user selects data to be subjected to image forming processing from the list displayed on the display device. When the user selects data, the processor 352 transmits information indicating the selected data to the client PC 10.

In contrast, in the case where it is determined in step S302 that "select data from folder and print" has been selected, the processor 352 transmits, in step S306, a request for acquisition of folder information to the resident application 102 of the client PC 10. Upon receiving the acquisition request from the mobile terminal 30, the resident application 102 of the client PC 10 transmits, to the mobile terminal 30, folder information based on, for example, folders that are currently open.

FIG. 17 is a diagram illustrating an example of the content of the folder information transmitted to the mobile terminal 30. In this example, the folder information is information used to identify certain folders and information indicating the paths to certain folders.

Referring back to FIG. 15, in step S307, the mobile terminal 30 receives the folder information from the client PC 10. In step S308, the processor 352 displays the acquired folder information on the display device. The user selects any of the folders displayed on the display device. When the user selects one of the folders, the processor 352 requests, in step S309, information regarding the files within the selected folder (hereinafter referred to as "in-folder information") from the resident application 102, and displays on the display device the in-folder information transmitted from the client PC 10 as a response to the request.

FIG. 18 is a diagram illustrating an example of the content of the in-folder information. In the example illustrated in FIG. 18, the in-folder information includes information regarding a subfolder and files stored in the specified folder. The user selects data to be subjected to image forming processing from a list of files and folders displayed on the display device. When the user selects a folder from the list, the processor 352 executes processing in steps S306 to S309 again. In contrast, when the user selects a file from the list, the process proceeds to step S310.

Referring back to FIG. 15, in step S310, when the user selects a file from the list, the processor 352 transmits information indicating the selected file (hereinafter referred to as "selected-file information") to the client PC 10. In step S311, the processor 352 transmits, to the client PC 10, a request for acquisition of setting data regarding the selected file.

Figure 19:
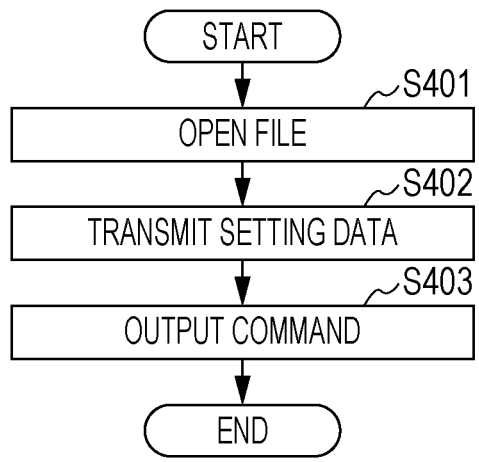
FIG. 19 is a flowchart illustrating the procedure of processing performed by the client PC.

FIG. 19 is a flowchart illustrating the procedure of processing performed by the client PC 10. The processing illustrated in FIG. 19 is started when the selected-file information is acquired from the mobile terminal 30. In step S401, the resident application 102 performs processing for opening the file indicated by the selected-file information by using an application selected in accordance with association settings at the OS of the client PC 10.

In step S402, the resident application 102 reads out the setting data corresponding to the selected file from the memory 151 and transmits the setting data to the mobile terminal 30.

Referring back to FIG. 15, in step S312, the processor 352 receives the setting data from the client PC 10. In step S313, the processor 352 displays, on the display device, a simple UI screen illustrating print settings including at least setting items corresponding to the received setting data. The simple UI screen is a simple screen which is designed to enhance ease of operation on a small screen and on which a print dialog box for the application 101 is simply displayed. Note that no application corresponding to the file indicated by the selected-file information is present in the grasped-application list, the processor 352 sends an error notification and ends printing. Examples of the case where no application corresponding to the file indicated by the selected-file information is present in the grasped-application list are the case where an application with no print function is activated and the case where an application with which nothing has been printed so far is activated.

Figure 20:
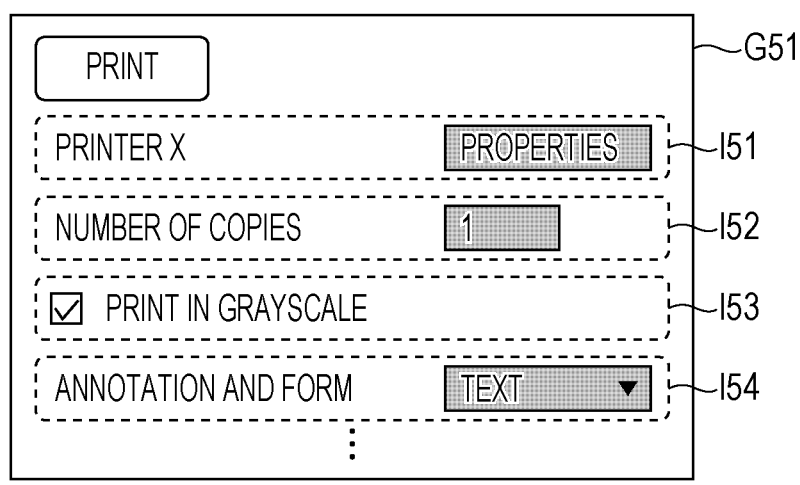
FIG. 20 is a diagram illustrating an example of a screen displayed on a display device of the mobile terminal.

FIG. 20 is a diagram illustrating an example of the simple UI screen. In this example, UI parts and at least either set values or item-name text for the setting items corresponding to the setting data and predetermined setting items are displayed, the UI parts and at least either the set values or the item-name text being used by the user to set settings of the setting items. In the example illustrated in FIG. 20, a simple UI screen G51 displays setting items 151 and 152 included in the setting data and also displays other setting items 153 and 154. For each setting item, item-name text is displayed in association with the UI part (a text box, a pull-down list, a check box, an option button, or the like) for the setting item. In the example illustrated in FIG. 20, for each setting item, the item-name text of the setting item is displayed at a position adjacent to the UI part for the setting item.

As the initial values of the respective setting items, initial values preset in the applications 101 may be used, or the set values used at the last performance of image forming processing may also be used. A button for selecting "print with last settings" may be displayed on the simple UI screen, and image forming processing with the last settings may be commanded when this button is selected.

Since the screen of the mobile terminal 30 is small, in the case where there are multiple setting items, the setting items may not be displayed simultaneously. In the case where the setting items are not displayed simultaneously on a single screen, the setting items may be separated into multiple pages and displayed or may be displayed in a scrollable manner. In this case, the processor 352 may change display positions of the setting items in accordance with the priority levels of the setting items or may change, for each setting item, whether to display the setting item. That is, in the case where multiple setting items are included in the print settings to be displayed, the processor 352 may set the priority levels of the setting items corresponding to the received setting data to be higher than the priority levels of the other setting items, and the simple UI screen may be displayed in accordance with the set priority levels. For example, the processor 352 may regard setting items that have not been operated as setting items having a low priority level, and the setting items whose priority levels are low may be arranged on a screen displayed after an advanced settings button (see an advanced settings button B61 illustrated in FIG. 21) is pressed. For example, the processor 352 may perform control such that the setting items whose priority levels are low are not displayed on the simple UI screen. Alternatively, the processor 352 may perform control such that the setting items having lower priority levels are arranged at lower positions on a screen where the setting items are displayed in a scrollable manner.

Figure 21:
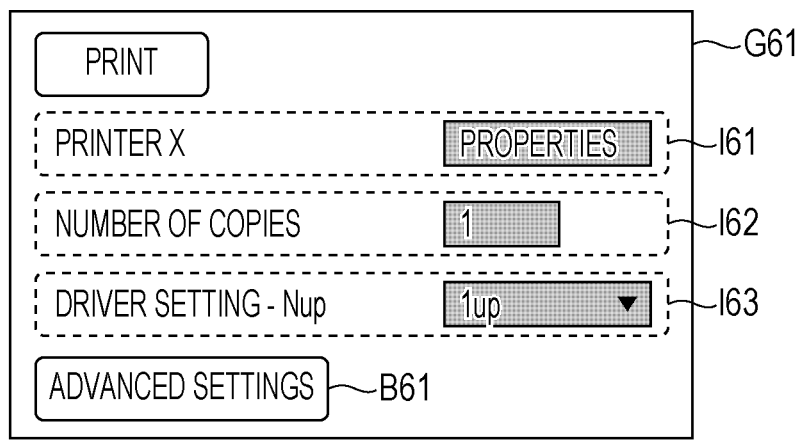
FIG. 21 is a diagram illustrating an example of a screen displayed on the display device of the mobile terminal.

FIG. 21 is a diagram illustrating another example of the simple UI screen. In FIG. 21, the advanced settings button B61 is a button for displaying setting items that are not currently displayed on the simple UI screen G61. The simple UI screen G61 displays setting items included in the setting data, which are a setting item 161 for the properties of the image forming apparatus 20, a setting item 162 for "number of copies", and a setting item 163 for "driver setting—Nup", in preference to the other setting items. When the advanced settings button B61 is selected by the user on this screen, the other setting items that are not currently displayed on the screen illustrated in FIG. 21 are displayed.

The user performs, using the simple UI screen illustrated in FIG. 20 or 21, an operation for changing the contents of the print settings to the contents that the user desires. When the user makes some changes to the set values of the print settings, the processor 352 reflects, in the set values included in the setting data received from the client PC 10, the changes in accordance with an operation performed by the user. After reflecting the changes in the print settings, the user presses a "print button" on the simple UI screen to issue an image forming command. When image forming processing is commanded by the user, the processor 352 notifies the resident application 102 of the client PC 10 of the image forming command including the changed setting data.

Referring back to FIG. 15, in step S314, when the user issues an image forming command using the UI screen of the mobile terminal 30, the processor 352 transmits the image forming command including the changed setting data to the resident application 102 of the client PC 10.

Referring back to FIG. 19, in step S403, upon receiving the setting data from the mobile terminal 30, the resident application 102 outputs, to the application 101 corresponding to the received setting data, a command to set the print settings in accordance with an operation corresponding to the received setting data. For example, in the case where the content of the image forming command including the setting data is that image forming using the application A is command and the number of copies is "5", the resident application 102 outputs, to the application 101, a command output in the case where the user performs, using the keyboard and the mouse at the client PC 10, a series of operations that are "displaying a print dialog box for the application A", "inputting "5" in the text box for the number of copies", and "pressing the print button". That is, the resident application 102 outputs a command corresponding to the series of operations to the application 101; that is, the resident application 102 operates the application 101 in a pseudo manner, so that the resident application 102 causes the application 101 to execute processing that is executed by the application 101 when the user performs the series of operations. The application 101 sets the print settings under control performed by the resident application 102, and outputs an image forming command to the printer driver 103. As a result, image forming is commanded for the file for the application A.

In addition, the application 101 holds, in the memory 151, setting data corresponding to the pseudo operation performed by the resident application 102. That is, in the exemplary embodiment, even when image forming processing is commanded through an operation performed at the mobile terminal 30, the setting data corresponding to the operation is added into the memory 151.

In this manner, in the exemplary embodiment, image forming with the changed print settings of the application 101 of the client PC 10 is commanded in accordance with the command from the mobile terminal 30. For example, in the case where the user wants to change the value set for the Nup setting or the value set for the color/monochrome setting and execute image forming processing again, the user changes the settings using the mobile terminal 30. The client PC 10 issues, in accordance with the setting data received from the mobile terminal 30, an image forming command to the printer driver 103.

In the case where image forming processing is executed again using processing data accumulated not in the client PC 10 but in the image forming apparatus 20, the print settings of the application 101 installed in the client PC 10 may not be reflected in the image forming processing. In contrast, in the case where an application is installed in the mobile terminal 30 to perform commanded image forming processing, ease of operation may not be achieved using the small screen of the mobile terminal 30. In contrast to this, the client PC 10 is remotely operated by the mobile terminal 30 and is caused to issue an image forming processing command in the exemplary embodiment. In this case, the mobile terminal 30 is caused to display a simple UI screen, and the user performs operations using this UI screen.

In addition, even in the case where the application 101 is new or not common and the case where the application 101 has a unique setting item, the setting item is displayed on the simple UI screen of the mobile terminal 30 regardless of whether the application 101 corresponding to the setting item is installed in the mobile terminal 30 in the exemplary embodiment.

In addition, the UI screen displayed at the mobile terminal 30 is a screen obtained by simplifying the print dialog box for the application 101.

In addition, for example, even when the user realizes that the user has forgotten to issue an image forming command from the client PC 10 after having reached the image forming apparatus 20, the user may issue the image forming command using the mobile terminal 30 without going back to the client PC 10 in the exemplary embodiment.

3. Modifications

The exemplary embodiment described above is a mere example of an exemplary embodiment of the present invention, and may also be modified as in the following. The exemplary embodiment described above and the following modifications may be combined in whole or in part and executed as necessary.

(1) The mobile terminal 30 specifies, in accordance with the client statuses (see FIG. 12), the client PC 10 to be caused to issue an image forming command among the multiple clients PC 10 in the exemplary embodiment described above; however, the client PC 10 does not have to be specified by using the specification method described above. For example, the client PC 10 to be operated from the mobile terminal 30 may be predetermined. In addition, the user may specify the client PC 10 to be caused to issue an image forming command by operating the operation devices of the mobile terminal 30.

(2) The display device of the mobile terminal 30 displays the simple UI screen, and the image forming command is issued from the mobile terminal 30 to the client PC 10 in the exemplary embodiment described above. However, the device that issues an image forming command to the client PC 10 is not limited to the mobile terminal 30. For example, a display of the image forming apparatus 20 may display the simple UI screen, and the image forming apparatus 20 may issue an image forming command to the client PC 10.

(3) The resident application 102 monitors the operation procedures for the applications 101 and generates the setting data in the exemplary embodiment described above; however, data indicating the operation procedures may be pre-stored in the memory 151.

In addition, in the exemplary embodiment described above, there may be a case where the user does not want the resident application 102 to perform monitoring. In order to deal with this case, monitoring processing may be performed when a "print procedure registration" mode is selected.

(4) Each client PC 10 may have a setting for selecting whether to allow the mobile terminal 30 to perform searching in the exemplary embodiment described above. In this case, in the case where the settings are set so that the mobile terminal 30 is not allowed to perform searching, the mobile terminal 30 may not acquire client information.

(5) In the case where the client information, which is a list of pieces of information, includes no piece of information that the user desires or in the where the client information needs to be updated, client-information acquisition may be performed again at a predetermined timing in the exemplary embodiment described above. An example of the latter case is the case where the client information is no longer latest after some time has passed.

In addition, in the exemplary embodiment described above, after the authentication has been successful, the filename of a file to be printed may be presented to the user and the user may be caused to confirm.

Figure 22:
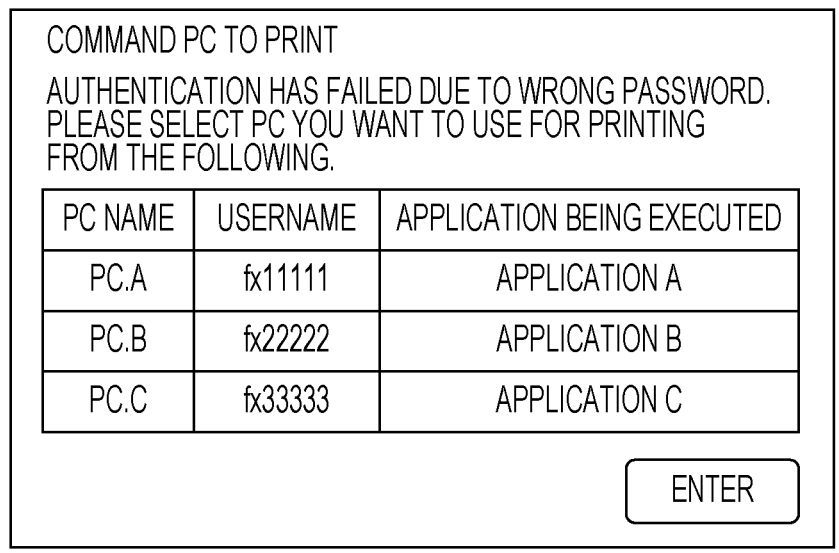
FIG. 22 is a diagram illustrating an example of a screen displayed in the case where authentication has failed.

In addition, in the exemplary embodiment described above, in the case where the authentication has failed, the user may be requested to input authentication information again. In this case, the operation screen of the mobile terminal 30 displays, again, the client selection screen together with a message illustrated in FIG. 22 and notifying the user that the authentication has failed. In this case, client-information acquisition is performed again.

(6) The system 1 including the three client PCs 10a, 10b, and 10c, the image forming apparatus 20, and the mobile terminal 30 is described in the exemplary embodiment described above; however, the number of devices included in the system 1 is not limited to that described above. For example, the system 1 may include multiple mobile terminals.

(7) The programs executed by at least either the processor 152 of the client PC 10 or the processor 352 of the mobile terminal 30 may also be downloaded through communication lines such as the Internet in the exemplary embodiment described above. These programs may also be recorded in a computer readable recording medium such as a magnetic recording medium (a magnetic tape, a magnetic disk, or the like), an optical recording medium (an optical disk or the like), a magneto-optical recording medium, or a semiconductor memory, and then the computer readable recording medium may be provided.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
a first terminal; and
a second terminal, wherein
the first terminal comprises a processor that is configured to act as:
  a monitoring unit that monitors operations performed on applications by a user,
  a holding unit that holds, on an application basis, setting data indicating the user's operation history regarding print settings in accordance with the monitored operations,
  a first transmitting unit that transmits the setting data to the second terminal, and
  an output unit that outputs, in a case where setting data is received from the second terminal, a command to set print settings and outputs an image forming command to a printer driver in accordance with an operation corresponding to the received setting data, to an application corresponding to the received setting data, and
the second terminal comprises a processor that is configured to acts as:
  a display control unit that acquires the setting data from the first terminal and displays, on a display, a screen illustrating print settings including at least a setting item corresponding to the acquired setting data, and
  a second transmitting unit that changes the acquired setting data in accordance with an operation performed on the second terminal by the user and transmits the changed setting data to the first terminal.

2. The system according to claim 1,
wherein the display control unit sets, in a case where the print settings include a plurality of setting items, a priority level of the setting item corresponding to the acquired setting data to be higher than a priority level of another setting item, and displays the screen illustrating the print settings in accordance with the set priority levels.

3. The system according to claim 2,
wherein in a case where the first terminal is one of a plurality of first terminals, the display control unit specifies, in accordance with information transmitted from the first terminals, a first terminal at which a screen illustrating print settings is open among the plurality of first terminals, and displays the screen in accordance with setting data acquired from the specified first terminal.

4. The system according to claim 1,
wherein in a case where the first terminal is one of a plurality of first terminals, the display control unit specifies, in accordance with information transmitted from the first terminals, a first terminal at which a screen illustrating print settings is open among the plurality of first terminals, and displays the screen in accordance with setting data acquired from the specified first terminal.

5. An information processing apparatus comprising:
a processor that is configured to act as:
  a monitoring unit that monitors operations performed on applications by a user;
  a holding unit that holds, on an operation basis, setting data indicating the user's operation history regarding print settings in accordance with the monitored operations;
  a first transmitting unit that transmits the setting data to a terminal including a display control unit and a second transmitting unit, the display control unit acquiring the setting data from the information processing apparatus and displaying, on a display, a screen illustrating print settings including at least a setting item corresponding to the acquired setting data, the second transmitting unit changing the acquired setting data in accordance with an operation performed on the terminal by the user and transmitting the changed setting data to the information processing apparatus; and an output unit that outputs, in a case where setting data is received from the terminal, a command to set print settings and outputs an image forming command to a printer driver in accordance with an operation corresponding to the received setting data, to an application corresponding to the received setting data.

6. A non-transitory computer readable medium storing a program causing a computer to execute a process, the process comprising:

monitoring operations performed on applications by a user;

holding, on an operation basis, setting data indicating the user's operation history regarding print settings in accordance with the monitored operations;

transmitting the held setting data to a terminal including a display control unit and a second transmitting unit, the display control unit acquiring the setting data from the computer and displaying, on a display, a screen illustrating print settings including at least a setting item corresponding to the acquired setting data, the second transmitting unit changing the acquired setting data in accordance with an operation performed on the terminal by the user and transmitting the changed setting data to the computer; and outputting, in a case where setting data is received from the terminal, a command to set print settings and outputting an image forming command to a printer driver in accordance with an operation corresponding to the received setting data, to an application corresponding to the received setting data.

* * * * *